Figure 1:
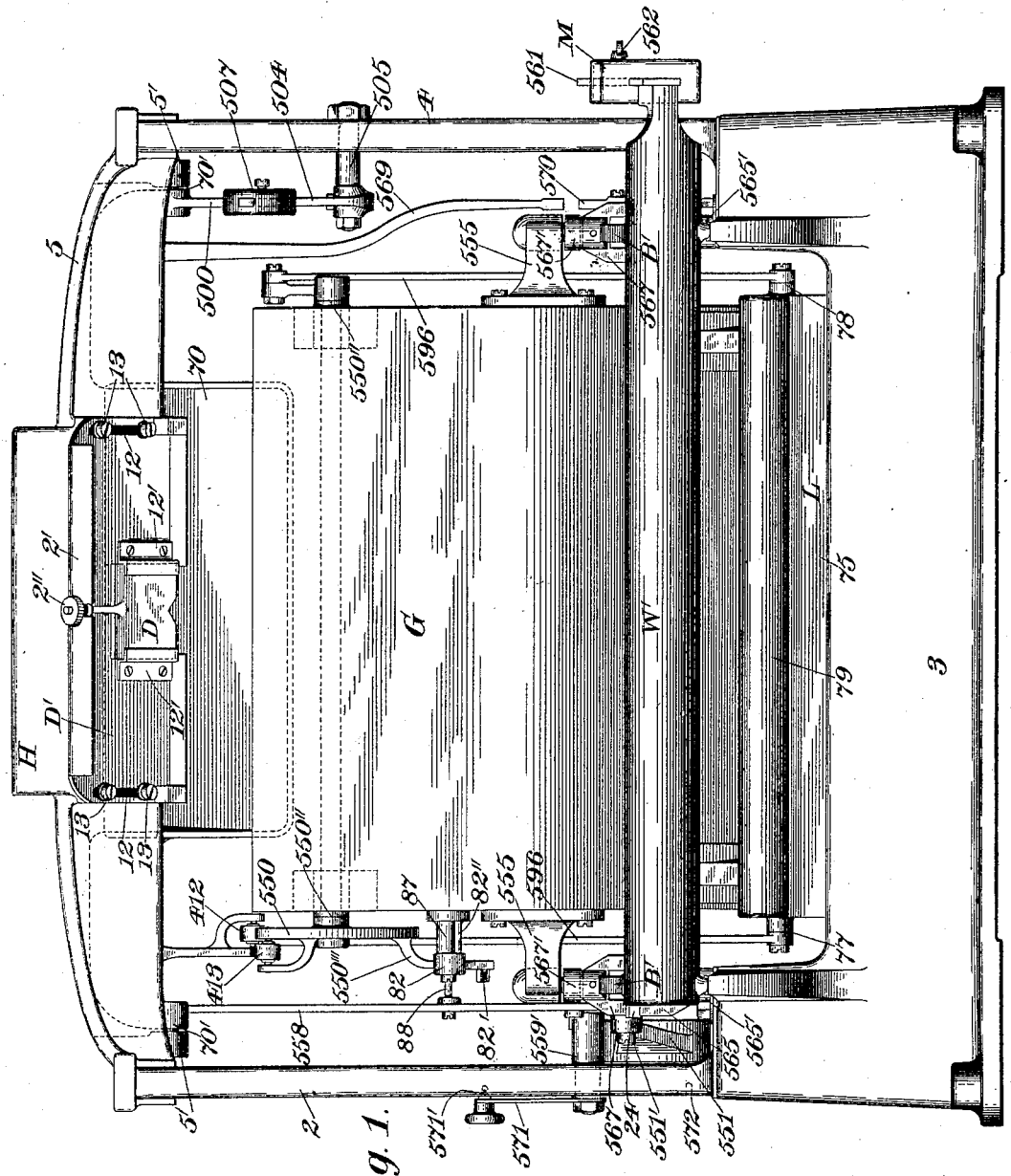

(No Model.) 8 Sheets—Sheet 1.
F. H. RICHARDS.
AUTOMATIC WEIGHING MACHINE.

No. 548,840. Patented Oct. 29, 1895.

Witnesses:
J. L. Edwards Jr.
Fred. J. Dole.

Inventor:
F. H. Richards (No Model.) 8 Sheets—Sheet 2.

F. H. RICHARDS.
AUTOMATIC WEIGHING MACHINE.

No. 548,840. Patented Oct. 29, 1895.

Witnesses:
J. L. Edwards Jr.
Fred. J. Dole.

Inventor:
F. H. Richards.

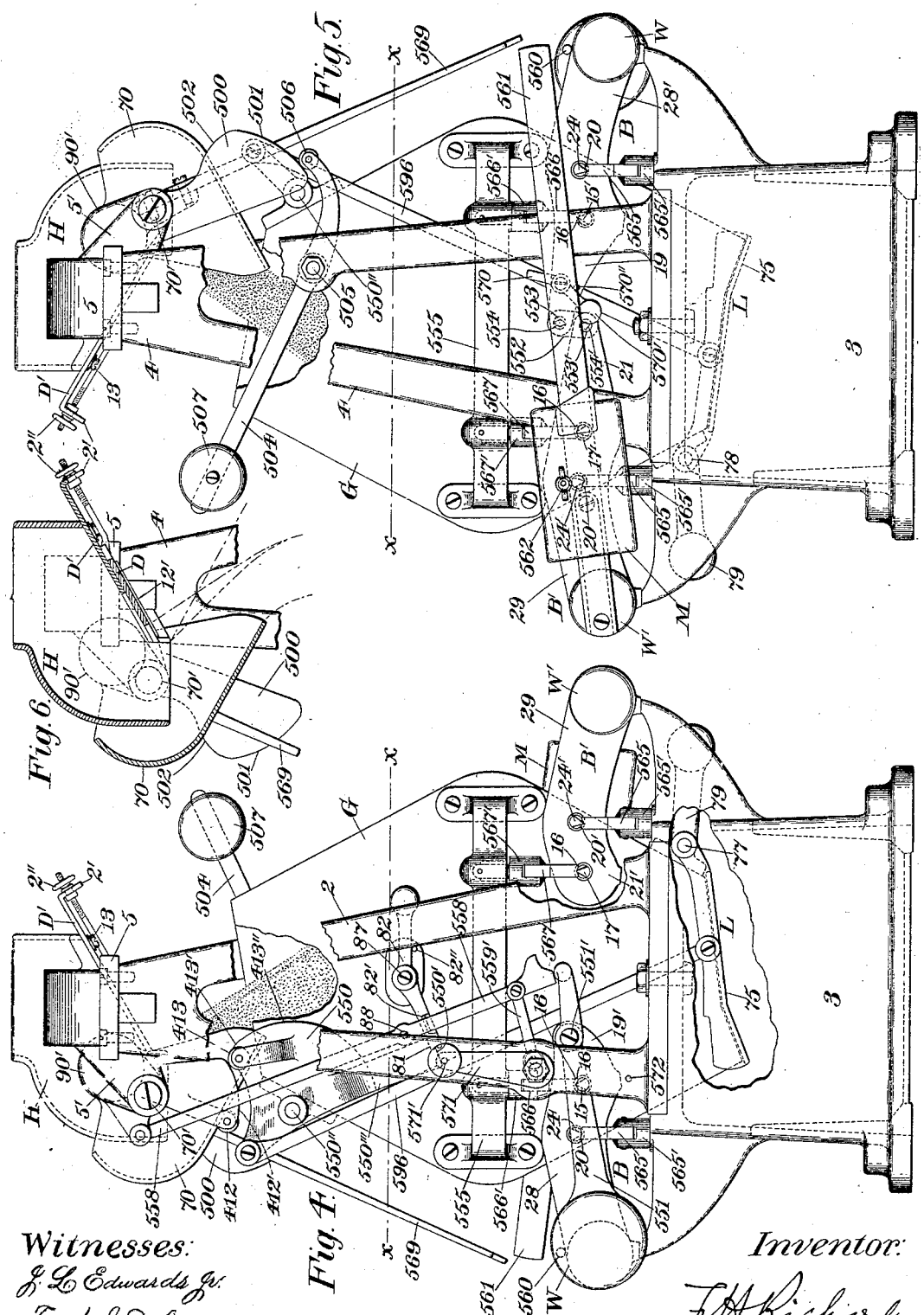

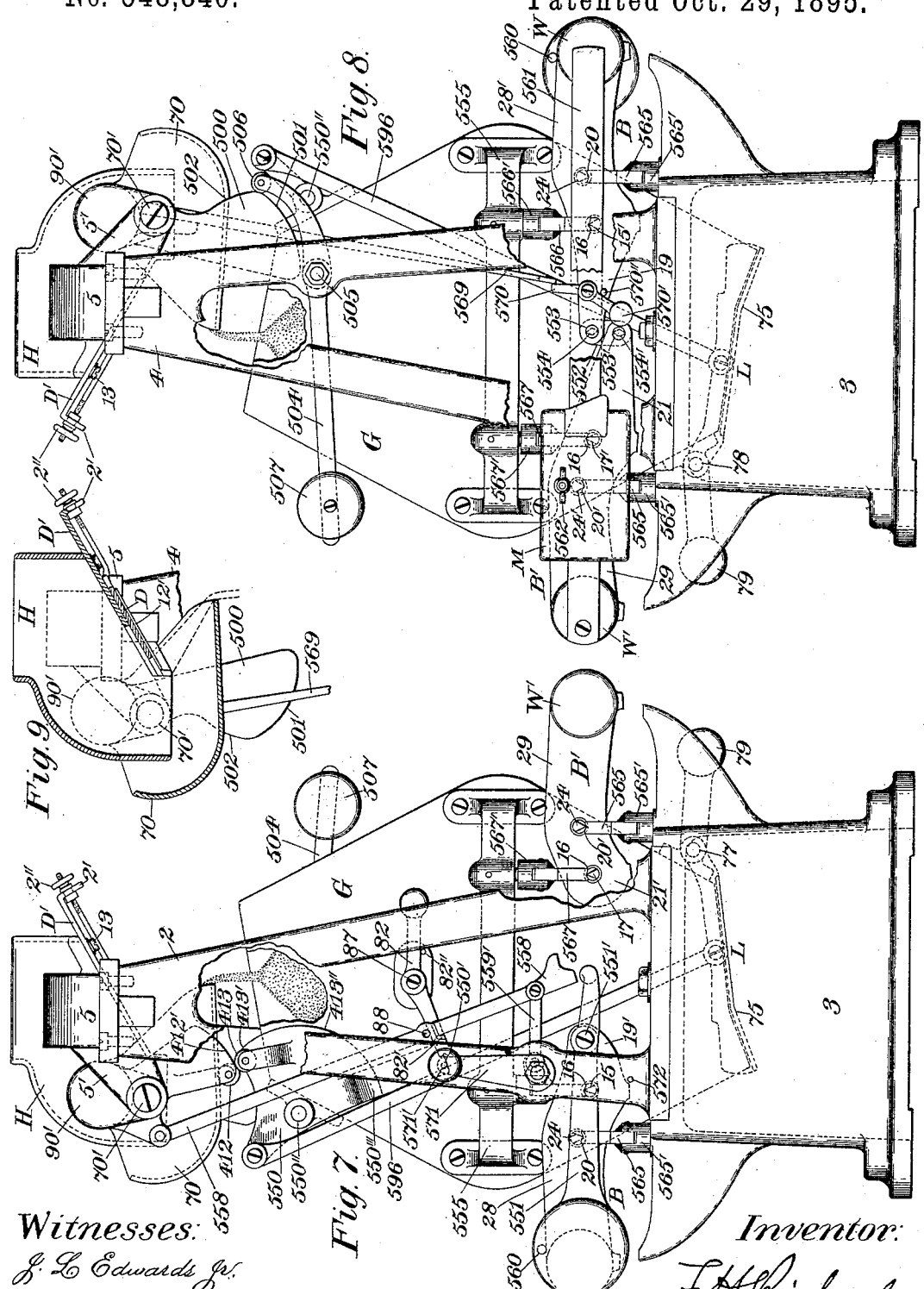

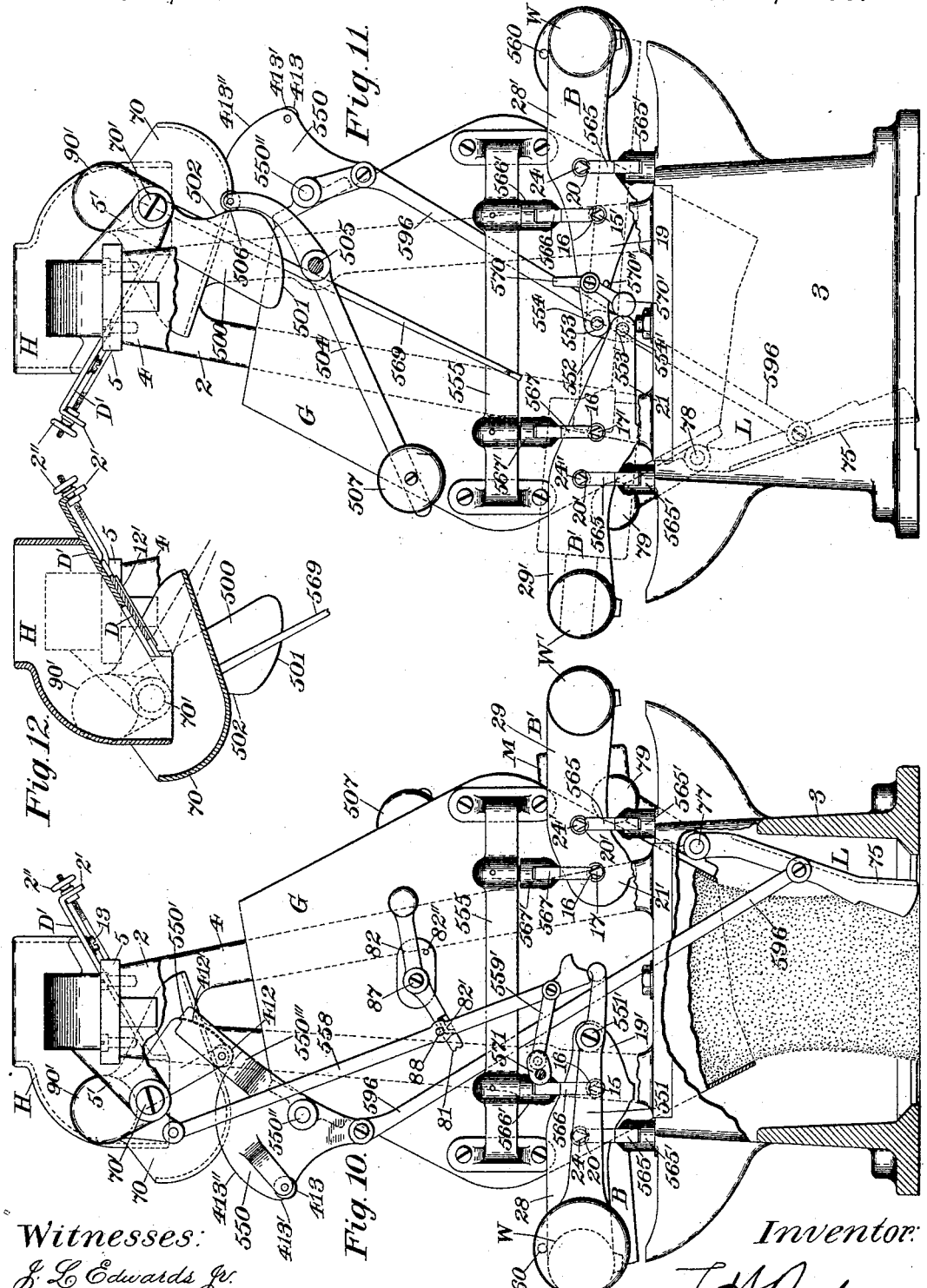

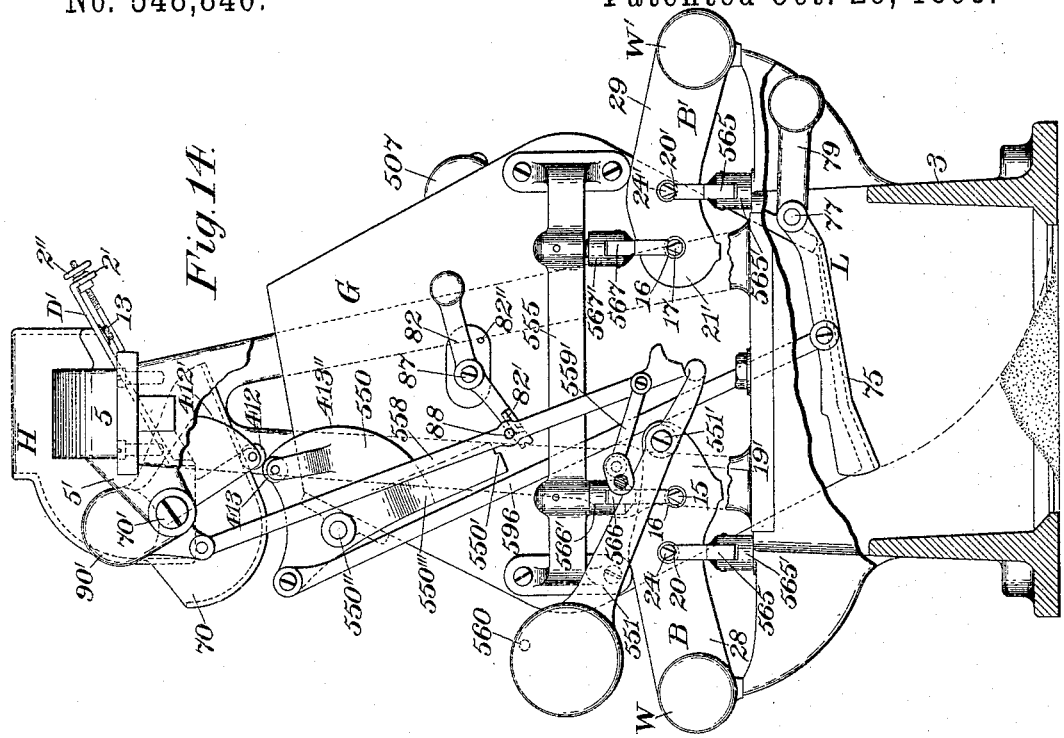
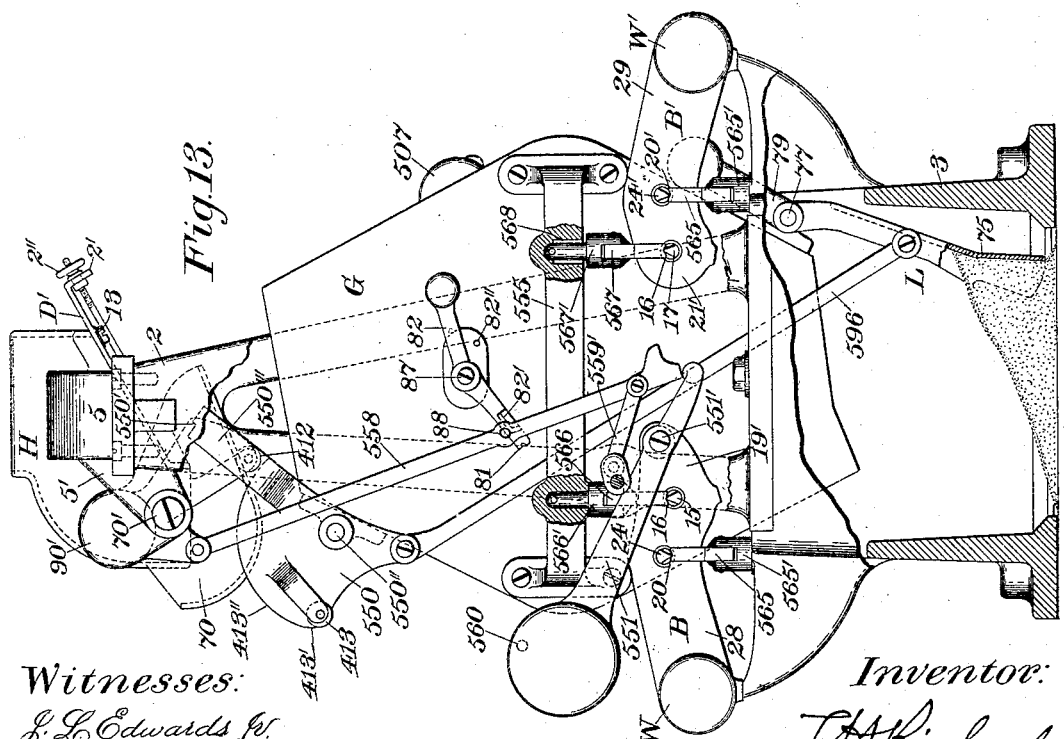

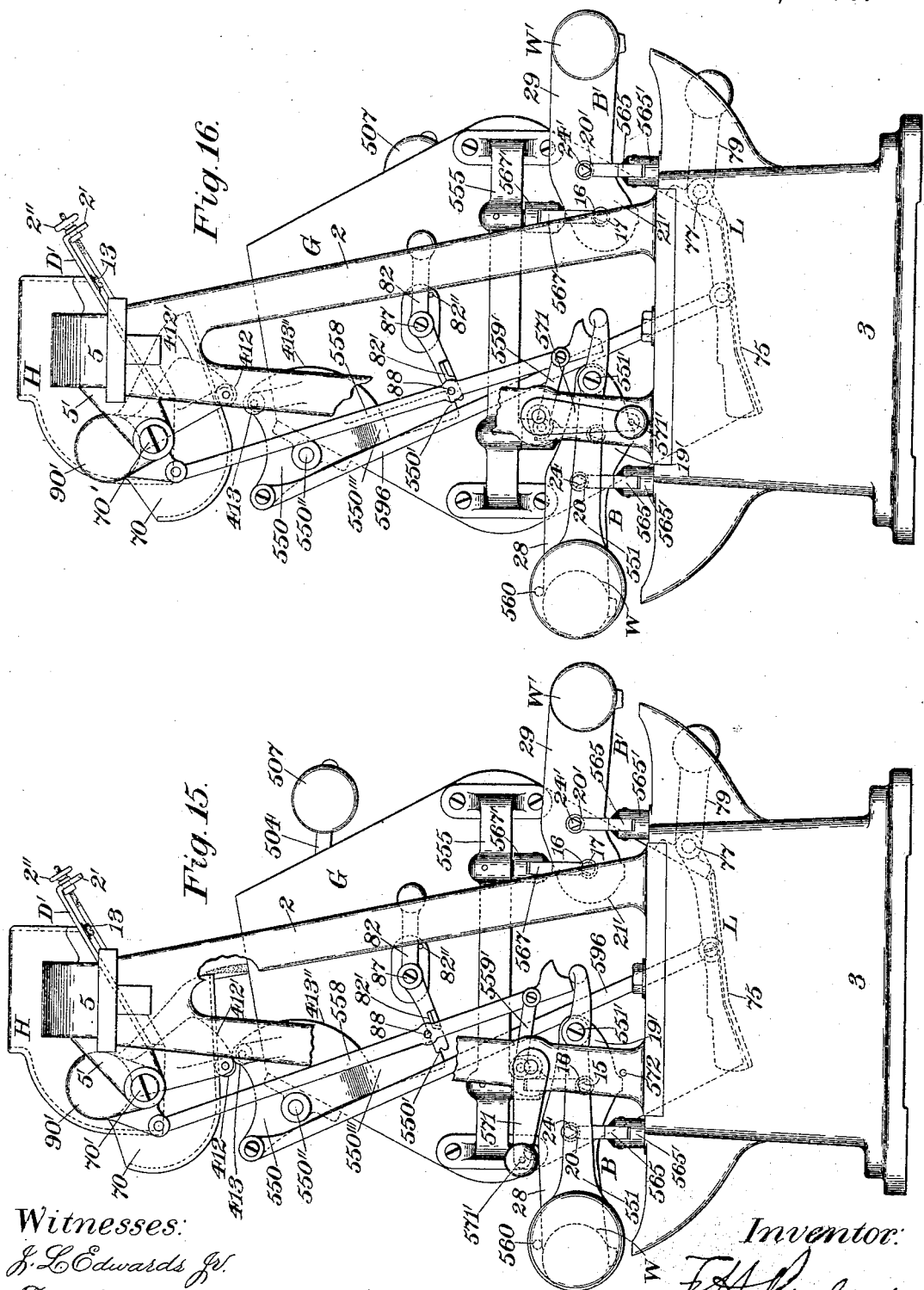

(No Model.) 8 Sheets—Sheet 8.

F. H. RICHARDS.
AUTOMATIC WEIGHING MACHINE.

No. 548,840. Patented Oct. 29, 1895.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 548,840, dated October 29, 1895.

Application filed April 16, 1895. Serial No. 545,878. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines, and more especially to that class of weighing-machines which are adapted for automatically and continuously weighing predetermined quantities of grain or other free-flowing materials, the main object being to provide an effective and accurate weighing-machine of the "single-bucket" class in which all of the operations of loading and discharging the bucket and opening, closing, locking, and unlocking the valve and the bucket-closer shall be performed by mechanisms comprising improved safety and actuating devices, whereby the operation of the valve mechanism and of the bucket mechanism shall be limited the one by the other, so as to prevent waste and insure the normal operation of the machine, and so as to prevent interference with that proper, predetermined, and necessary sequence of operations which is characteristic of the normal working of a perfectly-organized combination of mechanisms in a machine of this type.

This invention is in the nature of an improvement on the weighing-machine described and claimed in my prior application, Serial No. 541,087, filed March 9, 1895.

In weighing-machines as heretofore constructed the closer for the bucket has usually been released and the bucket opened by the release of a latch actuated by the descent of the bucket to a determined point, and to effect this release the actuating factor has usually been a portion of the force of the descending movement of the bucket mechanism. As the utilization of this movement necessarily involves the interposition of resistance to the descent of the scale beam or beams and the bucket mechanism, it will be obvious that just prior to the opening of the bucket-closer there will be a slight retardation of the downward movement of the bucket mechanism.

Another object of the invention, therefore, is to effect the release of the bucket-closer in such a manner that no resistance shall be thereby interposed to the proper bucket movement, and hence so that throughout its descent the bucket shall be unchecked and the rapidity of the weighing operation thereby insured.

A further object of the present invention is to provide means for preventing the normal sequence of operations of the several interdependent mechanisms if the valve should be accidentally tripped to close the same before the bucket is fully loaded and the scale-beam has reached the poising-line, and also to prevent such sequence of operations until the scale-beam has gone below the poising-line and has substantially arrived at the cut-off position.

A further object of the invention is to provide means for pivotally supporting the bucket upon oppositely-disposed scale-beams in such a manner that the bucket and the beams will be freely supported at all times and will have no tendency to wedge or bind at the pivotal points relatively to their supports.

Another object of the invention is to provide, in connection with the valve and the beam mechanism, means for positively locking the valve against closing during the poising or drip-stream period after the valve has been checked and stopped in such position, and so that the valve cannot be accidentally tripped to close the same until the beam mechanism has arrived at a predetermined point in its descending movement.

An additional object of the present invention is to provide, in connection with the supply-chute, drip-regulating devices whereby a regulable drip-opening in the front wall of the chute may have an independent regulation at the central portion of such opening for the purpose of obtaining a relatively larger outlet at such point, and thereby permitting the free escape of relatively large pieces or masses of material contained in the normally free-flowing or comminuted material forming the major portion of the stream supplied to the valve and the bucket.

Figure 2:
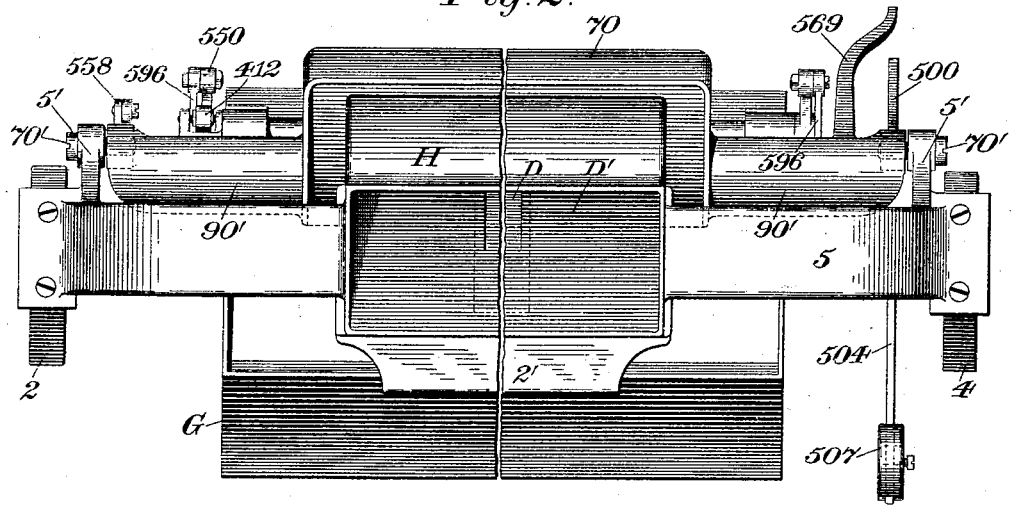
Figure 3:
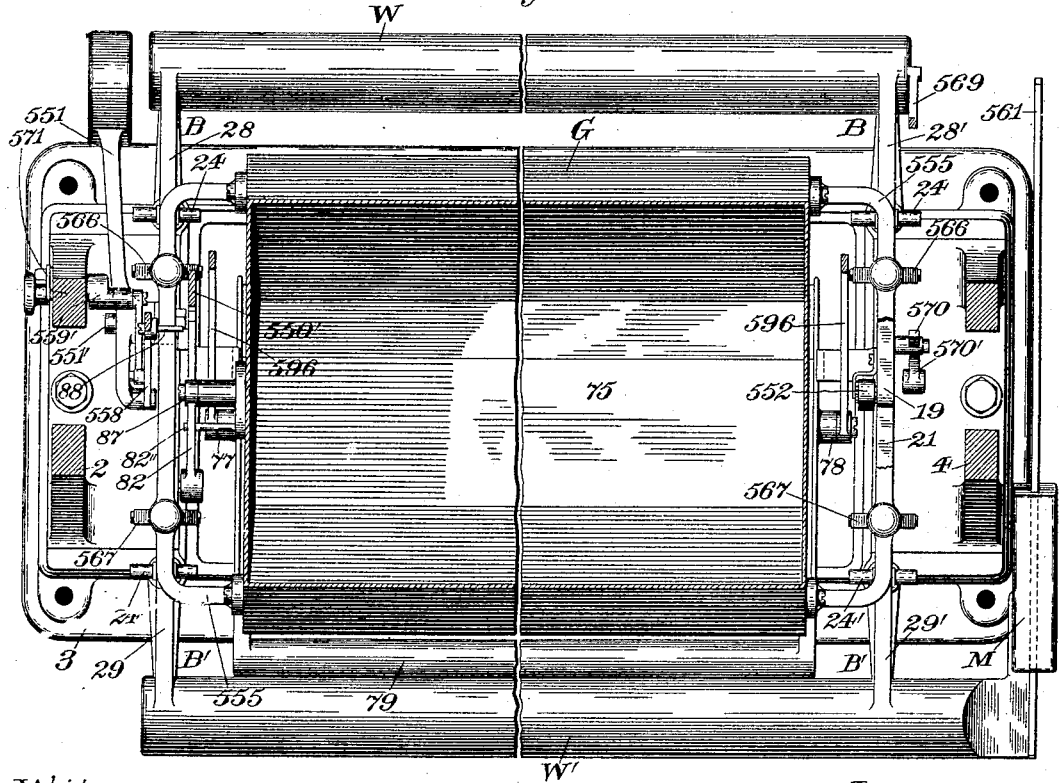
Figure 17:
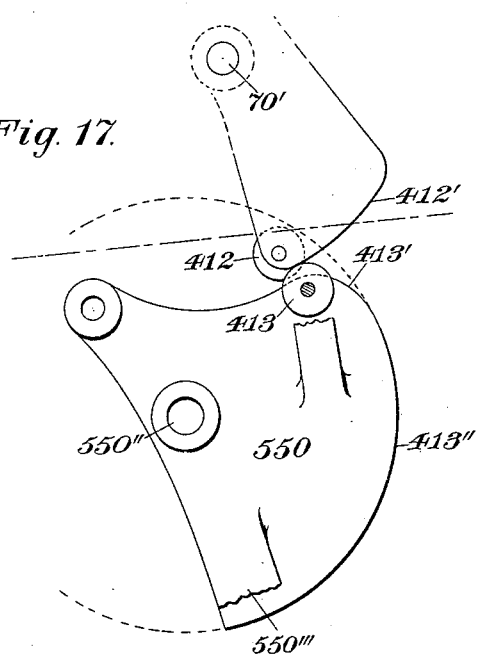

In the drawings accompanying and forming part of this specification, Figure 1 is a front elevation of a weighing-machine of the class described constructed in accordance with my present invention. Fig. 2 is a plan of that portion of the same above the line $x$ $x$, Figs. 4 and 5, and showing the machine broken in the center for the purpose of illustrating the same on a large scale. Fig. 3 is a horizontal section taken in line $x\,x$, Fig. 4, and showing the parts below said line, and also broken in the center to more clearly illustrate the construction. Figs. 4 and 5 are respectively left and right hand side elevations with portions of the mechanism broken away to more clearly illustrate the details of the construction and showing the several operative mechanisms in their normal positions with the valve open and delivering the material from the supply-chute into the bucket. Fig. 6 is a central sectional detail side elevation of the valve-chute and co-operating devices in positions corresponding with those shown in Figs. 4 and 5, respectively. Figs. 7 and 8 are opposite end elevations corresponding, respectively, with Figs. 4 and 5, the valve being shown in the drip position and the other operative mechanisms in the poising position of the machine. Fig. 9 is a view similar to Fig. 6 and showing the parts in positions corresponding with those illustrated in Figs. 7 and 8, respectively. Fig. 10 is a sectional end elevation; and Fig. 11, an opposite end elevation corresponding, respectively, with Figs. 4 and 5, the valve being shown in the cut-off position and the bucket-closer being wide open with the load discharging from the bucket. Fig. 12 is a view similar to Fig. 6, the parts being in position corresponding to those illustrated in Figs. 10 and 11, respectively. Fig. 13 is a sectional end elevation corresponding with Fig. 4, the valve being closed and the closer open with the bucket empty, and the valve-opening actuator, which will be hereinafter more particularly referred to, in position for opening the valve upon the unlocking of the valve by the locking shut of the closer. Fig. 14 is a sectional end elevation corresponding to Fig 4, the valve being closed and the closer open, but nearly closed and about to release the valve-opening actuator to permit the same to open the valve. Fig. 15 is an end elevation corresponding to Fig. 4, showing the parts in the preliminary testing position. Fig. 16 is an end elevation similar to Fig. 4 and showing the parts in the balanced or poised testing position. Figs. 17 to 20, inclusive, are detail side elevations illustrating successive relative positions of portions of the mechanism during the closing of the valve.

Like characters designate like parts in all the figures.

The framework for carrying the operative parts of the machine may be of any suitable construction and is shown in the drawings as comprising two side frames or uprights 2 and 4, mounted upon a chambered supporting-base 3 and connected by a top-plate 5, to which a suitable hopper, such as H, is shown secured by means of some suitable holding devices, such as fastening-bolts.

The side frames 2 and 4 are shown herein as carrying some suitable beam-supports, such as the V-shaped bearings 20 and 20', for supporting the scale-beams which carry the bucket mechanism consisting of the bucket and its operative devices.

As a means for supporting the bucket or load-carrying receptacle, which is designated in a general way by G, a pair of oppositely-disposed counterweighted beams are shown at B and B', respectively, as pivotally mounted on beam-supports—as, for instance, by means of the pair of pivots or knife-edges 24 and the oppositely-disposed pair of pivots or knife-edges 24'—and as having bucket-supports located intermediate of said beam-supports and adjacent to corresponding beam-supports, these bucket-supports being shown in the drawings as two remotely-disposed pairs of pivots or knife-edges 15 and 15' and 17 and 17'.

Each of the scale-beams B and B' is shown in the drawings as having a pair of beam-arms joined by a combined connecting-shaft and counterpoise, the counterpoise for the beam B being designated by W and that for the beam B' being designated by W'. Each of the scale-beams, therefore, has the usual bucket-poising and bucket-counterpoising portions. Each of the beam-arms comprises a bucket-poising and a bucket-counterpoising member or end, the bucket-counterpoising portions of the beam-arms for the scale-beam B being designated herein by 28 and 28', respectively, and the bucket-counterpoising portions of the oppositely-disposed arms of the beam B' being designated by 29 and 29', respectively.

For the purpose of supporting the bucket from and by the beam-arms the bucket-supports 15 and 15' and 17 and 17' are shown in the drawings as carried on the corresponding beam-arms of the two scale-beams B and B'.

Some suitable means for maintaining the movements of the scale-beams in unison, and hence the movements of the beam-arms in unison, will be employed, and I have shown such means herein as a connecting-link 552, joining the bucket-poising portions 19 and 21 of the scale-beams B and B'. These bucket-poising portions of the scale-beams, it will be evident, comprise all those portions of said beams which lie between the supporting knife-edges 24 and 24'. The bucket-poising portions of the scale-beams B and B' at the opposite end of the machine, and which are designated by 19' and 21', are not shown herein as connected, as it will be apparent that for the purpose of obtaining a unison movement a connection of the beams at one end of the machine will suffice.

As a means for obtaining a free movement of the link 552 relatively to the beam-arms, which it joins, said link is shown herein as having oppositely-disposed supports or bearing-faces—such, for instance, as the journalopenings 553 and 553'—for engaging oppositely-disposed pivots or knife-edges 554 and 554', shown herein (see Fig. 8) as carried by and on the inner ends of the bucket-poising portions 19 and 21 of the beam-arms.

The bucket or load-carrying receptacle is pivotally mounted on the oppositely-disposed scale-beams and is shown herein as having V-shaped bearing-faces 16, corresponding in number and position with the knife-edges 15 and 15' and 17 and 17'.

For the purpose of maintaining the proper relation between the bucket mechanism and the beam mechanism with respect to their supports a longitudinally-yielding connection is illustrated herein between one of said mechanisms and one or more of the oppositely-disposed pivotal supports on which it is mounted, and a laterally-yielding connection is also shown between one of said mechanisms and the pivotal supports therefor.

The supporting knife-edges and V-shaped bearings for the scale-beams and the bucket, respectively, may be organized in any suitable manner relatively to their connected parts; but in the forms thereof herein illustrated (see Fig. 13) the V-shaped bearings are shown as having not only a pivotal connection with the scale-beams at the points of their engagement with the knife-edges carried by said beams, but are also illustrated as having one or more pivotal points intermediate of such knife-edges and the fixed supports on the framework and bucket, respectively.

Each of the V-shaped bearings carried by the base 3 of the machine is shown as formed in the upper end of a bearing-block 565, pivotally mounted on a post 565', rising from the frame of the machine, so that said bearing-block will be capable of movement transversely of the scale-beams, but will be fixed against movement longitudinally of the machine. In a similar manner the V-shaped bearings 16, carried at one side of said bucket, (herein shown as the rearward side,) are illustrated as formed in the lower ends of bearing-blocks 566, pivotally mounted in hangers 566', depending from the brackets 555, which are shown as secured to the ends of the bucket G for supporting the same. The V-shaped bearings carried at the other side of the bucket (herein shown as the forward side) are also shown as formed in the lower ends of bearing-blocks 567, similar to those hereinbefore described, and these are also illustrated as pivotally mounted in pivot-blocks 567', depending in like manner from the brackets 555. The pivot-blocks 567', instead of being fixedly secured to the hangers, are in the present case illustrated as having a universal connection therewith, this connection being shown herein as formed by a suitable socket in the under side of each hanger and a corresponding ball end upon the connected portion of the bearing-block or pivot-block 567'. For the purpose of permitting the necessary free or universal movement of the bucket and these pivot-blocks relatively to each other the sockets in the hangers 555 are shown as widened out at 568 to allow free play of the connected parts.

The bucket-closer, which is designated in a general way by L, is shown as consisting of a suitably-formed plate or closer proper, such as 75, having a counterweighted arm 79, preferably formed integral therewith, the closer being also illustrated as pivoted at 77 and 78 to the lower side of the bucket and adjacent to one side of the discharge-opening thereof.

As a means for supporting the bucket-closer, an inverted toggle connection is shown in the drawings as connecting the closer and the bucket, and this toggle connection is so positioned as to be engaged by a closer-latch and held at about the angle of repose of the connection when the latch is in its operative position and the closer is shut. In the form thereof herein illustrated this toggle comprises some suitable rocker—such, for instance, as 550, pivoted adjacent to the upper rearward side of the bucket and having a long connecting-rod 596 pivoted to said rocker and also to the closer in such a manner that when the closer is shut the two pivots of said connecting-rod or toggle member will be nearly in line with and the upper of said pivots will be above the rocker-pivot, whereby when the rocker is engaged by the bucket-closer latch and held in that position the closer will be supported with a minimum pressure on the latch, as practically all of the weight of the bucket contents will be carried on the pivot 550'' of the rocker. The closer-latch for locking the rocker in position when the closer is shut and which is designated by 82 is shown herein as pivoted at 87 on one end of the bucket and as having a detent or stop 81 in position and adapted for engaging a co-operating stop on the toggle connection when the parts are in the closed position previously described. This co-operating stop of the toggle connection is illustrated at 550' as carried on the rocker 550 and as at the extreme end of a detent-arm 550''', which, when the closer is shut, depends obliquely from the rocker to engage the underlying closer-latch and lock the closer shut. The bucket-closer latch is shown as counterweighted and as limited in its movement toward the stop on the toggle connection by a suitable stop, such as 82''. It will be noticed that in the embodiment thereof illustrated in the present case the closer-latch swings upward to engage the stop-arm on the rocker and is released from engagement therewith by a downward movement.

As a means for controlling the stream from the supply-chute I prefer to employ a valve substantially similar to that shown in my Patent No. 535,727, granted March 12, 1895. I have shown such a valve at 70 as pivoted within arms or brackets 5', depending from the top plate of the machine, the pivot or axis of movement of the valve being designated by 70′. The valve employed is also illustrated as located substantially beneath the mouth of the supply-chute and as extending beyond the forward edge of said chute sufficiently far to support the descending column or stream when the valve is closed. This valve is also preferably balanced, so as to have normally no tendency to either open or close, the balance-weight being shown herein as a shaft 90′, extending from opposite ends of the valve-pan.

As a means for actuating the valve to close the same a lever is shown at 504 (see Fig. 5) as pivoted to the frame at 505 and as having at its forward end a friction-roller 506, adapted to engage the cam-surfaces 501 and 502 of a cam-lever and to oscillate said lever and thereby the valve itself. This cam-lever is shown at 500 as a depending arm movable with the valve and having a reducing cam-face 501 and a cut-off cam-face 502. The lever 504 is shown as weighted at its forward end at 507, the weight being preferably adjustable along the forward arm of the lever.

It will be obvious that by reason of the riding up of the roller 506 on the cam-faces of the cam-lever a progressively-decreasing leverage will be exerted on the valve for actuating the same during the closing movement thereof, and that by reason of the peculiar curvature of the cam-faces the force exerted by the weight 507, acting through the lever 504, will be applied to the valve in a peculiar ratio of decreasing efficiency, it being obvious that the cut-off cam-face will have a relatively-greater efficiency than the reducing cam-face, and that therefore the valve-closing actuator will be effective to close the valve quickly as soon as the friction-roller passes off of the reducing-face of the cam-lever.

In my Patent No. 535,729, granted March 12, 1895, I have shown and described means for limiting or intercepting the opening movement of the valve while the closer is open and for also limiting or intercepting the opening movement of the closer while the valve is open, in connection with means for actuating the valve to open and close the same independently of the operation of the bucket-closer, and in the present application this feature of a reciprocal control or mutual dependency of the opening movements of the valve and closer is retained.

In the present application I have illustrated, in connection with the valve mechanism and the bucket-closer, two coacting stops, one of which is shown at 412′ as operative with the valve and the other at 413 as operative with the closer, and in such positions that each is adapted to serve as a stop device for the other while the valve is open, and a second pair of stops, one of which is shown at 412 as operative with the valve and the other of which is illustrated at 550 as operative with the closer, and which are also positioned so that each serves as a stop device for the other while the closer is open. (See Figs. 17 to 20.) This closer-operative stop 550 is also shown herein as having a stop-face 413′, preferably cam-shaped and adapted to actuate the valve-operative stop 412 at the end of the normal cut-off movement of the valve for the purpose of imparting an additional closing movement to the valve, this closer-operative stop-face 413′ also preferably having an ascending movement with the bucket, which will impart a further closing movement of the valve or stream-controller. I prefer to have these stops oscillatory relatively to each other and to have one of the stops formed with its stop-face cam-shaped, as at 412′, and so positioned as to compensate for the downward movement of the bucket while the valve is open.

The rocker 550 is shown herein as constituting the closer-operative stop for coacting with the valve-operative stop 412 while the closer is open, and said rocker is illustrated as having secured thereto a valve-stop 413 in the form of a friction-roller and as also having supplementary stop-faces 413′ and 413″, the former of which is illustrated as defined by a curve departing from and within the arc defining the face 413″, and which arc is struck from the center of movement 550″ of the rocker. It will of course be obvious that the friction-roller 413 might be removed and a plain stop-face substituted out of the plane defining the path of the connected stop-faces 413′ and 413″. The valve 70 is also shown as having a stop 412, herein illustrated as a friction-roller, and a supplementary stop-face 412′, shown as a cam-face defined by a curve approaching an arc struck from the axis of the valve, and which arc intersects the curve of the cam-face at that end of said cam-face which is remote from the friction-roller or stop 412. The stop-face or friction-roller 412 is so organized relatively to the rocker 550 that it co-operates with the connected stop-faces 413′ and 413″, while the stop-face or friction-roller 413 is positioned to co-operate with the stop-face 412′, the stop-faces 412 and 413 being peripherally non-contiguous.

The two described stop-faces carried by the valve co-operate with the stop-faces carried by the rocker to limit or check the opening movement of the valve when the closer is released, the stop-faces 413 and 412′ forming one means for preventing the opening movement of the valve while the closer is open by limiting or checking the opening movement of the closer if the closer-latch is released during the period while the valve is actually open, and the stop-faces 412, 413′, and 413″ co-operating to form the other means for preventing the opening movement of the valve when the closer is released during the period while the valve is closed.

It will be seen that the prevention of the opening movement of the valve while the closer is open, when controlled by the stop-faces 413 and 412′, is primarily due to the prevention of the opening movement of the closer, as it tends to move when released by the latch, and that the action of said stop-faces renders it impossible for both the valve and the closer to open at this time.

The valve 70 is shown in the drawings as having a connecting rod or arm 558 pivotally secured to the upper rear portion thereof and as having the lower end of said rod in position and adapted to be engaged by a valve-opening actuator, which will now be described, said connecting-rod 558 being also illustrated as having a pivotal connection, which will be hereinafter referred to, to a fixed portion of the machine. The connecting-rod 558 is illustrated as constituting the means for transmitting to the valve the valve-opening movement of a valve-actuator, and that valve-actuator which has for its function the operation of opening the valve is shown herein as pivotally mounted on the scale-beam B. The valve-opening actuator may be any mechanical means in operative relation with the valve for opening the same, but in the form thereof illustrated this valve-opening actuator consists of a lever 551, pivoted at 551' to the scale-beam B and counterweighted at its rear end. This actuator 551, which constitutes a supplemental counterpoise or supplemental balancing means, normally forms a part of the bucket-counterpoising portion of the scale-beam B and is automatically shiftable onto the bucket-poising mechanism. This valve-opening actuator 551 is also illustrated as held in its normal position by means of a stop 560, integral therewith and engaging the beam B. It will be noticed that the pivot 551' of this actuator is shown located between the bucket-supports, so that any downward pressure exerted upon the inner end of the actuating-lever 551 relatively to the bucket will oscillate the supplemental counterpoise 551, and that a very slight oscillatory movement will shift the same from the counterpoising to the poising mechanism of the machine, (see Fig. 13,) and thereby not only add a relatively-considerable weight to the poising mechanism, but also subtract the same or substantially the same weight from the counterpoising mechanism.

The connecting-rod 558 has been described as having its lower end in position and adapted to be engaged by a valve-opening actuator, and hence it will be evident that the lever 551 constitutes the valve-opening actuator for engaging said rod. When free to actuate the valve for opening the same, this rod 558 forms a part of the actuating means and therefore a part of the valve-opening actuator; but when the opening of the valve is prevented it will also be evident that this rod forms a stop device for limiting or checking the valve-opening movement of valve-opening actuator 551.

From the preceding description of the operation of the bucket-closer latch and the closer-supporting means and of the operation of the valve-stops it will be apparent that reciprocally-effective valve-opening-movement and closer-opening-movement limiters are provided, the former of which is operative to limit or check the opening movement of the valve while the bucket-closer is open and the latter of which is effective to reciprocally limit or check the opening movement of the closer while the valve is open.

The valve-opening-movement and closer-opening-movement limiters may be any mechanical means which will operate reciprocally to prevent the opening of the valve while the closer is open and the opening of the closer while the valve is open. In the present case the stop-face 412' of the valve-stop is shown as constituting the closer-opening-movement limiter, and the rocker 550 is illustrated as forming the valve-opening-movement limiter.

As it is necessary in the normal operation of a weighing-machine of this general class that the valve-opening movement of the valve-opening actuator be prevented during that period in which the load in the bucket is being made up and after the valve has begun to close and is partially closed, it will be evident that if the valve-opening-movement limiter 550 is in its operative position it will be impossible for the valve-opening actuator 551 to be effective as such, as the rod 558 will engage said actuator and form a stop device for limiting or checking the valve-opening movement thereof.

The normal position of the valve mechanism in a weighing-machine as ordinarily constructed is that in which the full flow of the supply-stream into the bucket is permitted, and hence the actuator 551 for opening the valve is shown herein as of relatively-greater power or efficiency than the means for closing said valve. As the valve-opening actuator 551 is also illustrated as operated in opposition to the valve-closing means, it will be evident that the connecting-rod 558 constitutes not only a stop device for checking the valve-opening movement of the valve-opening actuator 551 during the period in which the valve-opening-movement limiter 550 is in its operative position and after the valve has begun to close and is partially closed, but also a stop device for preventing the closing movement of the valve during the period beginning with the release of the valve-opening-movement limiter 550 and ending with the commencement of the descent of the bucket and the scale-beams, the valve-opening movement of the valve-opening actuator 551 being checked, of course, during the descent of the bucket and the beams by the stop 560.

From the preceding description, read in connection with the drawings, it will be seen that the valve has its closing movement during the period in which the closer-opening-movement limiter 412 is in its operative position and that the valve-opening actuator 551 has its valve-opening movement alternating with the closing movement of the valve, and hence the valve-opening and valve-closing actuators are alternately effective. The connecting-rod 558 or some suitable means for reciprocally limiting the closing movement of the valve and the valve-opening movement of the valve-opening actuator 551 constitutes a valve-movement stop.

As a means for controlling the duration of the drip-stream, the valve is shown provided with a long depending stop arm or lever 569, oscillatory with the valve and in position and adapted to be engaged by a stop on the poising mechanism at a predetermined point in the oscillation of the valve and in the descent of such beam. (See Fig. 8.) This by-pass stop is shown at 570 as pivotally carried on the arm 19 of the scale-beam B and as having its upper end adapted to swing freely toward the rear of the machine and as having its forward movement limited by means of a stop 570″, also carried on the scale-arm 19. The length of the upper arm of this releasing device or by-pass latch relatively to the lever 569 is such that when the valve is stopped in its closing movement at the beginning of the poising or drip-stream period the latch will not release said lever until the bucket has reached and gone below the poising-line. In the organization herein illustrated this latch or by-pass stop is adjusted to release the lever 569 when the full load is made up in the bucket and just prior to the cut-off of the stream. (See Fig. 11.) The stop 570 is shown as provided with the usual counterweight 570′ at its lower end for retaining the same in its normal position for checking the oscillation of the lever 569. On the return movement of said lever the lower end thereof will swing the upper end of the latch backward and pass by the same to return to its normal position.

From the preceding description it will be seen that the bucket mechanism has two normally-connected members, one of which is shiftable relatively to the other for discharging the load, and an actuator operative with the valve for releasing the shiftable member by the power of the valve mechanism on the closing of the valve.

When the weighing mechanism has come very near to the close of the poising period, it is important to instantly bring about the actuation of this shiftable member of the bucket mechanism relatively to the other member for discharging the load. For effecting this result I have hereinbefore described a latch as provided for normally holding said shiftable member against such relative movement, and I also illustrate the valve mechanism as having a latch-actuator operative with the valve and in position and adapted for releasing the latch by the power of the valve mechanism on the closing of the valve, so that the operation of releasing such bucket-mechanism latch is performed independently of the bucket mechanism and without requiring any power therefrom. In this connection it will be understood that when the bucket mechanism comes, as described, very near to the close of its poising period or movement it becomes accurately balanced, so that for the time being it has practically no momentum, and therefore does not constitute a source of power from which power may be supplied for releasing the latch to discharge the load. By means of my present improvements this necessary power is supplied from the valve mechanism and is applied to the latch instantly on the closing movement of the valve and whether or not the bucket mechanism has in the meantime come precisely to the end of its descending movement. By means of the organization of mechanism here described, a preferred form of which is fully illustrated in the drawings and is hereinafter more particularly referred to, the weighing mechanism as a whole is brought to the highest efficiency, both in point of precision and speed of operation.

As it will be apparent that on the descent of the bucket and the scale-beams all those points in said scale-beams which are between the bucket-supports will have relatively-faster descending movements than those points in the bucket which correspond in position with said points in the beams it will be obvious that the closer-latch may be released by a properly-positioned actuator movable in unison with the descending beams. Such an actuator is shown at 88 as carried on the connecting-rod 558, and the closer-latch is also shown as having a stop-face 82′ in position for co-operating with the latch-actuator and adapted to be engaged to release the latch at a predetermined point in the descent of the bucket and the beams, (see Fig. 10,) owing to the relatively-rapid movement of such latch-actuator as compared with the movement of the closer-latch. It will be apparent that this relatively-rapid movement of the latch-actuator during the descent of the bucket is due to the fact that during such downward movement of the bucket mechanism the lower end of the connecting-rod 558 rests on the inner end of the counterpoise-lever 551 and is carried down therewith, (see Fig. 4,) except during the period in which the valve is held in the drip position against closing by means of the lever 569 and its latch, in the manner hereinbefore described. (See Figs. 7 and 8.) The position of the latch-actuator is so regulated relatively to the stop-face of the latch that the latch cannot be released from the stop 550‴ on the rocker by the operation of the latch-actuator until the bucket mechanism has reached the poising-line in the descending movement thereof. In the organization herein illustrated the positioning of these parts is such that this releasing action cannot take place in the normal operation of the machine until the arm 569 has been released by the by-pass stop on the scale-beam, and consequently cannot be released until the full load in the bucket has been completed, as in such normal operation, the latch-actuator will not come into engagement with the latch until the bucket has gone below the poising-line, and preferably until the bucket is almost at the limit of its descending movement so that in all positions of the mechanism, prior to the moment of cut-off the valve-movement stop 558 will normally serve to limit the movement of the latch-actuator and prevent the engagement of said actuator with the latch. (See Figs. 4 and 7.)

The connecting-rod 558 is illustrated herein as having a pivotal connection by means of a guide-link and a crank-arm 559' with the frame of the machine, said crank-arm being shown as formed integral with a lever 571, which is pivoted to said frame. In its normal position this lever is substantially perpendicular (see Fig. 4) and is shown as having a locking-pin 571' engaging in a corresponding locking-recess in the frame. It will be apparent that in this position the guide-link and crank-arm will hold the rod 558 so that it will be operative to engage the inner end of the counterpoise-lever 551 in the manner hereinbefore described. When the lever 571 is carried, however, to the position shown in Fig. 15, in which the locking-pin is shown as turned one-quarter of a revolution, while the end of the rod 558 will still be in position to engage the counterpoise-lever, the latch-actuator 88 will not be in operative relation with the stop-face 82' of the bucket-closer latch, and hence will not trip the latch to discharge the bucket. The stream of material fed into the bucket will, however, carry the bucket mechanism down below the poising-line and to the end of the range of its descending movement, and the weight of the load will hold the bucket mechanism at this point as long as the relative positions of the latch-actuator and latch and the rod 558 and the counterpoise-lever 551 remain unchanged. The position shown in Fig. 15 is the preliminary position for testing and for obtaining an accurate balance of the poising and the counterpoising mechanisms without discharging the load from the bucket. It will be obvious that when the counterpoising mechanism is carried below the position shown in said figure the valve will close and the drip-stream will be cut off. If now the lever 571 is thrown to the position shown in Fig. 16, with its locking-pin in engagement with the corresponding recess 572, it will be apparent that the connecting-rod 558 will also be withdrawn from operative relation with the counterpoise-lever 551, whereupon if the bucket has been properly loaded the counterpoising mechanism will rise from its lowermost position (shown, for instance, in Fig. 11) and will swing up and down until it comes to rest at the poising-line. If the lever 571 is then thrown back to the position shown in Fig. 4, the rod 558 will be brought into engagement with the counterpoise-lever, and the latch-actuator will engage the stop-face 82' and release the latch to thereby discharge the load.

It will be seen, therefore, that I provide, in connection with the valve, an actuator which is normally operative therewith for releasing the shiftable member of the bucket mechanism to discharge the load, and means for throwing the actuator and the valve out of operative relation to the shiftable member. This actuator is preferably in the form of a rod pivotally connected with the valve for oscillation and having a pivotal connection with a lever adapted to be set to successive positions and held in such positions. It will also be obvious that a valve-movement stop normally operative with the valve and in operative relation with the scale-beams is also provided and that the connecting-rod just described constitutes this stop; also, that means are provided for shifting the actuator and the stop to successive positions into and out of operative relation with the shiftable member of the bucket mechanism and the scale-beam, respectively, the organization being such that the actuator may be shifted to its inoperative position while the stop remains in operative relation with the beam.

The testing operation shown and described with reference to Figs. 15 and 16, it will be understood, is performed at infrequent intervals—as, for instance, when beginning the operation—and the test itself is not automatic, but is controlled by an attendant. This test may also be employed when the machine has been weighing material of one specific gravity and is beginning to operate with material of a different specific gravity.

For the purpose of weighing different loads and for determining the weight of a partial load I have shown herein a scale-arm at 561 as carried by and movable with the scale-beam B', and as having a supplemental balancing-weight, such as M, slidable thereon. This supplemental weight may be clamped to the scale-arm in any well-known manner, a clamping-screw 562 being shown herein for this purpose.

In the present application I have also illustrated means for regulating the volume of the drip-stream, the devices herein employed being in the nature of an improvement on the means employed in my prior application, Serial No. 542,137, filed March 18, 1895.

In the present case I prefer to employ two regulating slides or gages vertically movable relatively to each other, in the plane of the forward wall of the supply-chute, one of these slides being shown at D' (see Fig. 1) as controlling an opening in the lower edge of the forward wall of the supply-chute, and, in fact, as constituting the lower forward wall of the chute or spout and as having slots 12 at its opposite ends adapted to receive the shanks of binding-screws, such as 13, which pass into the fixed portion of the chute and hold the slide or gage D' in any desired adjusted position. It will be obvious that by the vertical adjustment of this gage the area of the supply-outlet may be varied at will (within limits) and that at the same time by the projection of the lower edge of the slide D' toward the bottom of the valve 70 or its withdrawal away from the bottom of said valve, the volume of the drip-stream will be correspondingly varied. The gage D' is herein illustrated as having a cut-away or recessed portion at the center of its lower forward edge and extending for a considerable distance toward the upper edge thereof for the purpose of obtaining an additional regulation of the drip-stream. At the opposite sides of this recess or opening the gage D' is shown as having guides 12' secured thereto for engaging and holding a supplementary vertically-adjustable gage, which is shown at D as held in place between said guides and the face of the gage D'. As a means for adjusting this supplementary drip-gage a screw-threaded rod is shown in the drawings as secured thereto and extending through an opening in the flanged end 2' of the gage D' and as having an adjusting-nut 2'' mounted for rotation on the threaded rod, in the usual manner and held against longitudinal movement by the walls of the recess in the flange 2'. It will be obvious that by manipulating the adjusting-nut to raise or lower the gage D the volume of the central portion of the drip-stream may be regulated independently of the adjustment of the gage D'; also, that this central adjustment is especially adapted to provide a larger outlet at the central portion of the outflowing drip-stream, whereby the efflux of relatively-large pieces or masses of material is facilitated.

The operation of a machine constructed in accordance with my invention as hereinbefore set forth will now be described.

Figure 18:
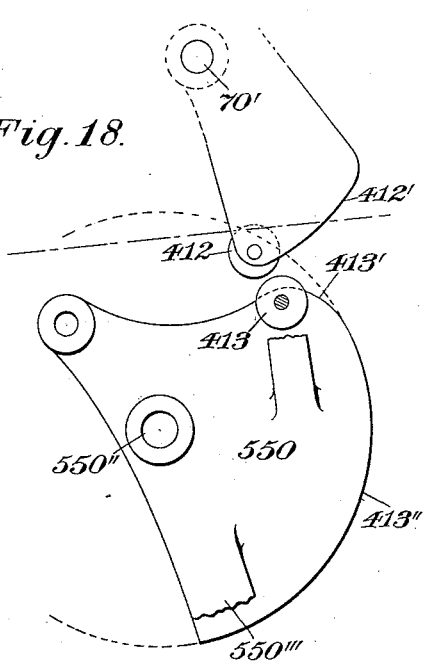
Figure 19:
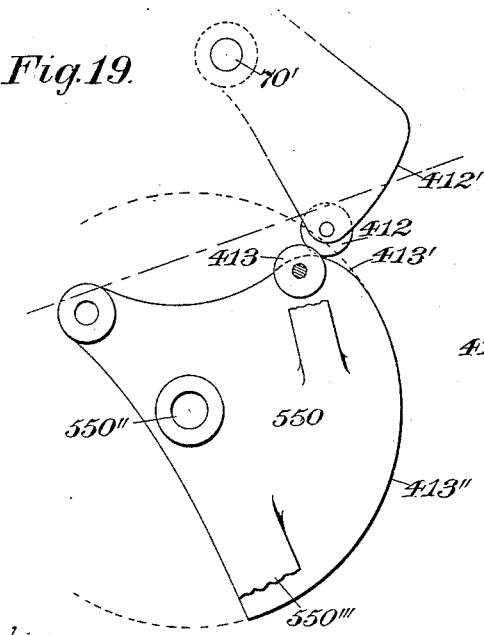
Figure 20:
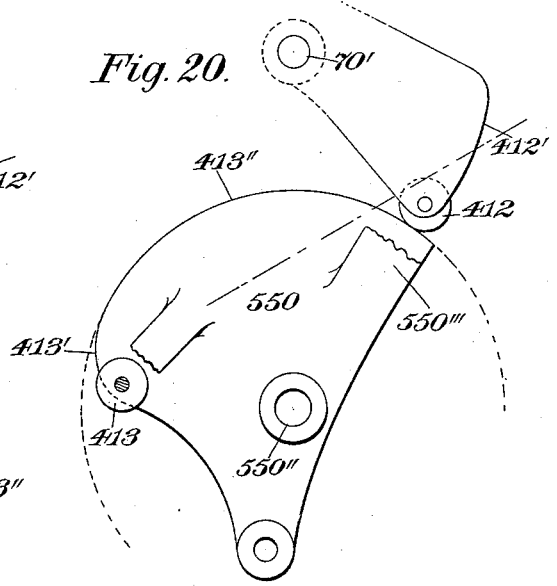

With the parts in the position shown in Figs. 4 and 5 (the normal position for the commencement of the operation) the valve is wide open and permits the uninterrupted flow of the stream issuing from the supply-chute down into the bucket. At this time the closer-opening-movement limiter 412' is operative to hold the closer shut, and hence the valve-opening-movement limiter 550 lies below and with the roller 413 at the forward end of the cam-face 412' of the valve-stop. (See Fig. 4.) At this time also the closing movement of the valve is checked by the abutment of the valve-movement stop 558 against the valve-opening actuator 551 and the valve-opening actuator 551 is inoperative as such. As soon as the load is sufficiently made up to permit the descent of the bucket and the scale-beams the valve-opening actuator 551, falling slowly from under the valve-movement stop 558, permits the valve-closing movement to begin by the riding of the friction-roller of the valve-cam up the reducing-face thereof, and at the same time the stop-face 412' is shifted relatively to the valve-opening-movement limiter 550 until the valve-arm 569 strikes the upper end of the detent 570, (see Fig. 8,) when said valve-opening-movement limiter will be adjacent to the extreme rear end of said stop-face 412', as clearly shown in detail in Fig. 17, and will be in position for the friction-roller 412 of the valve-stop to engage the cam-face 413' on the release of the arm 569. The parts are now in the position shown in Figs. 7 and 8. The by-pass stop 570, carried by the scale-beam B, is now in engagement with the lever 569, but is slowly descending to release the same. The relative positions of the stop-faces carried by the valve and the rocker, respectively, at the end of the poising or drip-stream period and just prior to the release of the valve are shown in Fig. 18, from which it will be evident that no other movement has taken place than the descent of the rocker and its stop-faces for a distance corresponding to the downward movement of the bucket. During the time in which the valve is locked in the drip position by the by-pass stop 570 the valve-movement stop 558 rises from the valve-opening actuator 551, owing to the continuation of the descent of the beams, (see Fig. 7,) and on the release of the arm 569 by the by-pass stop the valve is quickly carried to the cut-off position by the riding of the friction-roller of the valve-cam up the cut-off face thereof, and the valve-movement stop, which at the moment of the release of the lever 569 was some distance above the valve-opening actuator 551, is thrown quickly against said actuator. (See Fig. 10.) The whole force exerted by the valve is thus thrown onto the valve-opening actuator and an added impetus due to the weight, momentum, and impact of the valve and its closing mechanism is given to the bucket-poising mechanism to carry the same rapidly to the limit of the descending movement. At the same time the release of the latch 82 is effected by the latch-actuator 88, operated by the valve. At the moment of the release of the arm 569 the opposite movements of the valve-stop and the rocker bring the cam-face 413' into engagement with the friction-roller 412, (see Fig. 19,) and as the rocker is now at the limit of its downward movement the angular closing movement of the valve will be increased by an amount corresponding substantially to the amount by which the curve of the cam-face 413' departs from an arc (shown in full and dotted lines) having the center of movement of the rocker as its center. The position shown in Fig. 19 is that at which the valve has reached the end of its own range of closing movement, controlled by the valve-closing actuator 551, and the additional angular distance which said valve is caused to travel in passing from the position shown in Fig. 19 to that illustrated in Figs. 10, 11, and 12, respectively, is, it will be obvious, controlled through the opening of the bucket-closer by the weight of the load in the bucket. It will also be noticed that when the rocker 550 is carried to the position shown in these views and the additional closing movement is imparted to the valve the valve-opening actuator 551 will be slightly raised from the scale-beam and the weight of said actuator will be thrown onto the poising side of the machine. The valve-opening-movement limiter 550 being now in engagement with the valve-stop, it is apparent that it will be impossible to open the valve, while the parts are operatively organized, until the closer is shut. As soon as the proper portion of the load has been discharged from the bucket the bucket and the scale-beams will of course tend to rise, but thereupon (owing to the fact that the valve-movement stop 558 is a rigid abutment by reason of the valve-opening-movement limiter 550 being in its operative position) the return of the valve-opening actuator will be prevented. If the valve-opening actuator is supplemental to the main counterpoise mechanism, as illustrated at 551 in the drawings, this supplemental counterpoise will be held by the valve-movement stop 558, as shown in Fig. 13, while the remainder of the balancing mechanism returns to the normal position. As the bucket rises, the valve-opening-movement limiter 550 will of course be carried with it and the valve will be given an additional oscillating closing movement about its pivot, as will be evident by reference to Fig. 20. It will be apparent that the valve-opening actuator 551 will be inoperative as such by the valve-movement stop 558 until the closer is entirely shut, as the valve-opening-movement limiter 550 is not released from its engagement with the valve until the very last part of this closer movement and until in its closing movement the closer has passed the position shown in Fig. 14. As soon as the closer is completely shut the bucket-closer latch 82 will re-engage the stop-arm 550''' of the closer-supporting means to limit the opening movement of the closer, and at the same moment (owing to the withdrawal of the valve-opening-movement limiter 550 on its return stroke) the valve-opening actuator 551 becomes operable for reverse oscillatory movement and, returning to its normal position, forces the valve open, the closer-opening-movement limiter 412' simultaneously engaging the roller 413''. At the same time the arm 569, oscillating with the valve, strikes and goes by the by-pass stop on the scale-beam, the valve-closing actuator is returned to its normal position by the riding of its friction-roller down the faces of the valve-cam, and the several mechanisms are in position for passing through another cycle of movements.

It will be seen from the foregoing that all of the operations of such a weighing-machine as herein described are positively interdependent and that so long as the machine is operatively organized it is impossible for the movements of the valve and the closer to take place in any other than a determined order.

The operation of the latch-actuator 88 and the valve-movement stop 558 is such that the operation of releasing the closer is dependent directly upon the descent of the bucket and the beam mechanism to a certain predetermined point, and until this point is reached neither the bucket-closer latch 82 nor the latch-actuator 88 can be effective to cause the release of the bucket-closer, as the descent of the beam mechanism must, by its relatively-faster descending movement as compared with that of the bucket, create the space through which the latch-actuator must move before said actuator can engage the latch.

Having thus described my invention, I claim—

1. In a weighing-machine, the combination with a bucket mechanism having two members, one of which is shiftable, relatively to the other, for discharging the load; of a valve for controlling the supply of material to the bucket; and an actuator operative with the valve, and in position and adapted for releasing the shiftable member, on the closing movement of the valve, and by the power of the valve mechanism.

2. In a weighing-machine, the combination with a bucket mechanism having two members, one of which is shiftable, relatively to the other, for discharging the load; of a latch normally holding said shiftable member against movement; a valve for controlling the supply of material to the bucket; and a latch-actuator operative with the valve, and in position and adapted for releasing the latch, on the closing movement of the valve, and by the power of the valve mechanism.

3. In a weighing-machine, the combination with a bucket mechanism having two members, one of which is shiftable, relatively to the other, for discharging the load; of a valve for controlling the supply of material to the bucket; and an actuator secured to said valve, and in position and adapted for releasing the shiftable member, on the closing movement of the valve, and by the power of the valve mechanism.

4. In a weighing-machine, the combination with a bucket mechanism having two members, one of which is shiftable, relatively to the other, for discharging the load; of a valve for controlling the supply of material to the bucket; and an actuator pivotally connected with the valve, and in position and adapted for releasing the shiftable member, on the closing movement of the valve, and by the power of the valve-mechanism.

5. In a weighing-machine, the combination with a bucket mechanism having two members, one of which is shiftable relatively to the other, for discharging the load; of a valve for controlling the supply of material to the bucket; an actuator pivotally connected with the valve, and in position and adapted for releasing the shiftable member on the closing movement of the valve, and by the power of the valve mechanism; and a guide for controlling the movements of said actuator, relatively to the shiftable member.

6. In a weighing-machine, the combination with a bucket mechanism having two members, one of which is shiftable, relatively to the other, for discharging the load; of a valve for controlling the supply of material to the bucket; and an actuator operative with the valve, and independently of the bucket movement, and in position and adapted for releasing the shiftable member, on the closing movement of the valve, and by the power of the valve mechanism.

7. In a weighing-machine, the combination with a bucket mechanism having two members, one of which is shiftable relatively to the other for discharging the load; of a valve for controlling the supply of material to the bucket; limiting means in position and adapted for normally limiting the shifting movement of said shiftable member; an actuator co-operative with the valve, and located for normally releasing said limiting means; and means for releasing the valve and the actuator at the close of the poising-period, whereby said actuator will also release said limiting means to thereby permit a shifting movement of said shiftable member, and by the power of the closing-valve.

8. In a weighing-machine, the combination with a bucket mechanism having two members, one of which is shiftable relatively to the other for discharging the load; of a valve for controlling the supply of material to the bucket; a limiter in position and adapted for normally limiting the shifting movement of said shiftable member; a latch in position and adapted for holding said limiter against movement; an actuator co-operative with the valve; and located for normally actuating the latch by the power of the valve; and means for releasing the valve and the actuator at the close of the poising-period, whereby said actuator will actuate the latch, thereby releasing the limiter to permit a shifting movement of said shiftable member.

9. In a weighing-machine, the combination with a bucket mechanism having two members, one of which is shiftable, relatively to the other, for discharging the load; of a valve for controlling the supply of material to the bucket; an actuator connected with the valve, and having, during the descent of the bucket, a relatively-rapid descending movement as compared with that of the bucket, and in position and adapted for releasing the shiftable member, on the closing movement of the valve, and by the power of the valve mechanism; a stop-arm carried by the valve; and a co-operating stop operative with the poising mechanism, and in position and adapted for engaging the stop-arm on the valve, at the commencement of the poising-period, and thereby holding the valve, and for releasing said stop-arm on the descent of the poising mechanism to a predetermined point, to thereby permit the closing movement of the valve.

10. In a weighing-machine embodying a scale-beam, the combination with a bucket mechanism having two members, one of which is shiftable, relatively to the other, for discharging the load; of a valve for controlling the supply of material to the bucket; an actuator connected with the valve and having, during the descent of the bucket, a relatively-rapid descending movement as compared with that of the bucket, and in position and adapted for releasing the shiftable member, on the closing movement of the valve, and by the power of the valve mechanism; a stop-arm carried by the valve; and a co-operating stop carried by the scale-beam, and having during the descent of the bucket, a relatively-rapid descending movement as compared with that of the bucket, and in position and adapted for engaging the stop-arm on the valve, at the commencement of the poising-period and thereby holding the valve and for releasing said stop-arm, on the descent of the beam to a predetermined point, to thereby permit the closing movement of the valve.

11. In a weighing-machine embodying a scale-beam, the combination with a bucket mechanism having two members, one of which is shiftable, relatively to the other, for discharging the load; of a valve for controlling the supply of material to the bucket; and an actuator operative with the valve, and movable in unison with the scale-beam, and having a relatively-rapid descending movement as compared with that of the bucket, and normally in position and adapted for releasing the shiftable member, at a predetermined point in the descent of the bucket, and by the power of the valve mechanism, and also shiftable out of operative relation with said shiftable member, for thereby preventing the release of said shiftable member, and preventing the discharge of the load.

12. In a weighing-machine, the combination with a scale-beam; of a bucket mechanism having two members, one of which is shiftable, relatively to the other, for discharging the load; a valve for controlling the supply of material to the bucket; a stop carried by the valve; a co-operating stop carried by the poising mechanism of the machine, and in position and adapted for engaging the stop on the valve, at the commencement of the poising-period, and thereby holding the valve and the valve-operative actuator, and for releasing the valve-stop on the descent of the beam to a predetermined point; and an actuator operative with the valve, and having, during the stream-reducing movement of the valve, a downward movement in unison with that of the scale-beam, and relatively rapid as compared with that of the bucket, and held by the valve against downward movement, while the valve is held in the drip-position, and having a descending movement into engagement with the shiftable member of the bucket mechanism on the release of the valve-stop, for thereby discharging the load.

13. In a weighing-machine embodying a bucket and a scale-beam, the combination with a valve having its closing movement during the period in which the closer-opening-movement limiter is in its operative position;

of a bucket-closer; reciprocally-effective valve-opening-movement and closer-opening-movement limiters; a valve-opening actuator operable on the return stroke of the valve-opening-movement limiter; a valve-movement stop in position and adapted for reciprocally limiting the closing movement of the valve and the valve-opening movement of the valve-actuator; a stop-arm carried by the valve; a co-operating stop operative with the poising mechanism of the machine, and in position and adapted for engaging the stop-arm on the valve, and holding the valve at the commencement of the poising-period, and for releasing said stop-arm on the descent of the beam to a predetermined point; and an actuator operative with the valve, and having, during the descent of the bucket, a relatively-rapid descending movement as compared with that of the bucket, and in position and adapted for releasing the closer-opening-movement limiter, on the release of the stop-arm by the scale-beam stop, for thereby discharging the load, substantially as described, and for the purposes set forth.

14. In a weighing-machine embodying a bucket and a scale-beam, the combination with a valve having its closing movement, during the period in which the closer-opening-movement limiter is in its operative position; of a bucket-closer; reciprocally effective valve-opening-movement and closer-opening-movement limiters; a valve-opening actuator operable on the return stroke of the valve-opening-movement limiter; a valve-movement stop operative with the valve, and having, during the descent of the bucket, a relatively-rapid descending movement as compared with that of the bucket, and in position and adapted for reciprocally limiting the closing movement of the valve and the valve-opening-movement of the valve-actuator; a stop-arm carried by the valve; a co-operating stop carried by the scale-beam and in position and adapted for engaging the stop-arm on the valve, at the commencement of the poising-period and thereby holding the valve and for releasing said stop-arm on the descent of the beam to a predetermined point; and an actuator operative in unison with the valve-movement stop, and normally in position and adapted for releasing the closer-opening-movement limiter, on the release of the stop-arm by the scale-beam stop, for thereby permitting the release of the closer-opening-movement limiter for discharging the load, and said actuator having a movement out of operative relation with the closer-opening-movement limiter, while the valve-movement stop is maintained in operative relation with the valve-opening actuator, for thereby preventing the release of the closer-opening-movement limiter, and preventing the discharge of the load, substantially as described, and for the purposes set forth.

15. In a weighing-machine, the combination with a supply-chute having an opening in the lower edge of its forward wall; and with a valve operative under the supply-chute for controlling the stream from said chute; of a vertically-adjustable drip-gage controlling said opening in the forward wall of said supply-chute, and said gage also having a central opening in the lower edge of its forward wall; and a supplementary vertically-adjustable drip-gage carried by the first-mentioned gage, and controlling said central opening in the forward wall of such gage, substantially as described.

16. In a weighing-machine, the combination with a supply-chute having an opening in the lower edge of its forward wall; and with a valve operable under the supply-chute for controlling the stream from said chute; of a vertically-adjustable drip-gage controlling said opening in the forward wall of said supply-chute, and said gage having a central opening in the lower edge of its forward wall, and said gage also having guides at opposite sides of said opening; and a supplementary vertically-adjustable drip-gage carried by the first-mentioned gage, and slidable in said guides, and controlling said central opening in the forward wall of said gage, substantially as described.

17. In a weighing-machine, the combination with a valve mechanism; and with a bucket having a closer; of two coacting stops, one operative with the valve, and the other operative with the closer, and in position and adapted, each to serve as a stop device for the other, and the latter of said stops having a cam-face in position and adapted to actuate the first-mentioned stop, to impart an additional closing movement to the valve, at the end of the normal cut-off movement thereof.

18. In a weighing-machine the combination with a bucket mechanism having two members, one of which is shiftable relatively to the other for discharging the load; of a valve for controlling the supply of material to the bucket; and a pair of coacting stops, one operative with the valve and the other operative with the shiftable member of the bucket mechanism, and in position and adapted, each to serve as a stop device for the other, while the valve is open; and a second pair of coacting stops, one operative with the valve, and the other operative with the shiftable member of the bucket mechanism, and in position and adapted to serve, each as a stop device for the other during the bucket-discharging period, substantially as specified.

19. In a weighing-machine, the combination with a bucket mechanism having two members, one of which is shiftable relatively to the other for discharging the load; of a valve for controlling the supply of material to the bucket; a pair of coacting oscillatory-stops, one operative with the valve, and the other operative with the shiftable member of the bucket mechanism, and in position and adapted to serve, each as a stop device for the other, during the bucket-discharging period; and the latter of said stops having a cam-face in position and adapted to actuate the first-mentioned stop, to impart an additional closing movement to the valve at the end of the normal cut-off movement thereof.

20. In a weighing-machine, the combination with a bucket mechanism having two members, one of which is shiftable relatively to the other for discharging the load; of a valve for controlling the supply of material to the bucket; and a pair of coacting oscillatory-stops, one operative with the valve, and the other operative with the shiftable member of the bucket mechanism, and in position and adapted to serve, each as a stop-device for the other, during the bucket-discharge period; and the latter of said stops having a stop-face in position and adapted to actuate the first-mentioned stop, and to impart an additional closing movement to the valve, at the end of the normal cut-off movement thereof, and said stop-face having an ascending movement with the bucket, and adapted thereby to actuate the first-mentioned stop, to impart a further closing movement to the valve, substantially as specified.

21. In a weighing-machine, the combination with a bucket mechanism having two members, one of which is shiftable relatively to the other for discharging the load; of a valve for controlling the supply of material to the bucket; a pair of coacting stops, one operative with the valve, and the other operative with the shiftable member of the bucket-mechanism, and in position and adapted, each to serve as a stop device for the other, while the valve is open, and one of said stop-members having its stop-face cam shaped and positioned to compensate for the downward movement of the bucket; and a second pair of coacting-stops, one operative with the valve, and the other operative with the shiftable member of the bucket mechanism, and in position and adapted to serve, each as a stop-device for the other, during the bucket-discharging period, substantially as specified.

22. In a weighing-machine, the combination with a pair of beam-supports; of a beam mechanism having a pair of oppositely-disposed counterweighted-beams pivotally mounted on said supports, and also having a pair of bucket-supports intermediate of and adjacent respectively to said beam-supports; means for maintaining the movements of said beams in unison; a bucket mechanism pivotally mounted on said bucket-supports; and a longitudinally-yielding connection between one of said mechanisms and one of its pivotal supports, substantially as described.

23. In a weighing-machine, the combination with two pairs of beam-supports; of a beam mechanism having a pair of oppositely-disposed counterweighted-beams pivotally mounted on said supports, and also having two pairs of bucket-supports intermediate of and adjacent respectively to said beam-supports; means for maintaining the movements of said beams in unison; a bucket mechanism pivotally mounted on said bucket-supports; and a laterally-yielding connection between one of said mechanisms and its pivotal supports, substantially as described.

24. In a weighing-machine, the combination with two members, one of which is shiftable, relatively to the other, for discharging the load; of a valve for controlling the supply of material to the bucket; an actuator normally operative with the valve for releasing said shiftable member; and means for throwing the actuator and the valve out of operative relation to said shiftable member, substantially as described, and for the purpose specified.

25. In a weighing-machine, the combination with two members, one of which is shiftable, relatively to the other, for discharging the load; of a valve for controlling the supply of material to the bucket; an actuator normally operative with the valve for releasing said shiftable member; a lever having a pivotal connection with said actuator, and operative for setting the actuator in successive positions; and means for holding the lever in said successive positions, substantially as described.

26. In a weighing-machine, the combination with two members, one of which is shiftable, relatively to the other, for discharging the load; of a valve; a scale-beam; a valve-movement stop operative with the valve, and normally in operative relation with the scale-beam; an actuator operative with the valve, and normally operative for releasing the shiftable member of the bucket mechanism; and means for shifting the actuator and the valve-movement stop to successive positions.

27. In a weighing-machine, the combination with two members, one of which is shiftable, relatively to the other, for discharging the load; of a valve; a scale-beam; a valve-movement stop operative with the valve, and normally in operative relation with the scale-beam; an actuator operative with the valve and normally operative for releasing the shiftable member of the bucket mechanism; and means for shifting the actuator out of operative relation with the aforesaid shiftable member of the bucket mechanism, while maintaining the valve-movement stop in operative relation with the scale-beam.

28. In a weighing-machine, the combination with two members, one of which is shiftable, relatively to the other, for discharging the load; of a valve; a scale-beam; an oscillatory connecting-rod pivoted at its upper end to the valve and having its lower end normally in operative relation with the scale-beam; an actuator carried on said rod, and normally operative for releasing the shiftable member of the bucket mechanism, and shiftable out of operative relation with said shiftable member of the bucket mechanism, while the rod is maintained in operative relation with the scale-beam; a lever having a pivotal connection with said rod, and operative for setting the rod in successive positions; and means for holding the lever in said set positions.

29. In a weighing-machine, the combination with a valve and with a scale-beam; of an oscillatory connecting-rod pivoted at its upper end to the valve, and having its lower end normally in operative relation with the scale-beam; a link secured to said connecting-rod; a lever pivoted to said link and to the frame of the machine; and means for holding said lever in successive positions, substantially as described.

30. In a weighing-machine, the combination with a valve and with a scale-beam; of a bucket-latch; an oscillatory connecting-rod pivoted at its upper end to the valve, and having its lower end normally operative in relation with the scale-beam; a latch-actuator secured to the connecting-rod, and normally in position for releasing the bucket-latch, on the descent of the scale-beam to a predetermined point, and shiftable out of operative relation with the bucket-latch; a link secured to said connecting-rod; a lever pivoted to said link and to the frame of the machine; and means for holding said lever in successive positions, substantially as described.

FRANCIS H. RICHARDS.

Witnesses:
FRED. J. DOLE,
T. W. POTTS.